United States Patent [19]

Kibler

[11] 4,310,074
[45] Jan. 12, 1982

[54] BRAKE LEVELING AND POSITIONING STRUCTURE

[75] Inventor: Robert L. Kibler, St. Joseph, Mich.

[73] Assignee: Lambert Brake Corporation, St. Joseph, Mich.

[21] Appl. No.: 92,571

[22] Filed: Nov. 8, 1979

[51] Int. Cl.³ .......................................... F16D 55/224
[52] U.S. Cl. ................................. 188/72.9; 192/70.24
[58] Field of Search ................... 188/71.1, 73.3, 72.6, 188/72.9, 72.7; 192/70.24

[56] References Cited

U.S. PATENT DOCUMENTS

| | | | |
|---|---|---|---|
| 3,141,527 | 7/1964 | Henderson | 188/72.6 |
| 3,463,274 | 8/1969 | Hollnagel et al. | 188/72.7 |
| 3,708,041 | 1/1973 | Hahn | 188/72.9 |
| 3,853,206 | 12/1974 | Kibler et al. | 188/72.9 |
| 3,935,927 | 2/1976 | Haraikawa | 188/73.3 |
| 4,042,073 | 8/1977 | Dickenson | 188/72.9 |
| 4,199,042 | 4/1980 | Kibler | 188/71.1 |

FOREIGN PATENT DOCUMENTS 741620 8/1966 Canada ................ 188/72.6

Primary Examiner—George E. A. Halvosa
Attorney, Agent, or Firm—Trexler, Bushnell & Wolters, Ltd.

[57] ABSTRACT

Structure for supporting or suspending a brake from a vehicle is described and claimed. The brake itself comprises a U-shaped brake housing for partially surrounding a brake disc mounted on a wheel. An actuator lever-accepting slot is formed in the brake housing member. Several mounting bolts extend between the brake housing legs. A first stator friction element is carried on one housing leg for engaging one side of the brake disc, and a second stator friction element is carried at least partially within the housing for engaging an opposite side of the brake disc. An actuator lever extends through the housing slot; the lever is connected to the housing and engages the second stator element for drawing the housing in one direction to urge the first stator element into disc engagement while driving the second stator element in an opposite direction to urge the second stator element into disc engagement. The mounting structure includes a mounting bracket fixed to and extending from a portion of the vehicle. Mounting bolts extend through the mounting bracket and between the brake housing legs, and spacer bushings engage the mounting bolts over an extended portion of their lengths. These spacers or bushings engage the mounting bracket at a single position, but with sufficient rigidity to orient the spacers in a predetermined direction relative to the mounting bracket. This causes the mounting bolts and, consequently, associated brake parts to be carried in a predetermined position relative to the mounting bracket. Pivot plates extend through the housing actuator lever slot and bear against the actuator lever and the housing to urge the actuator lever into a predetermined plane of positions relative to the housing.

2 Claims, 5 Drawing Figures

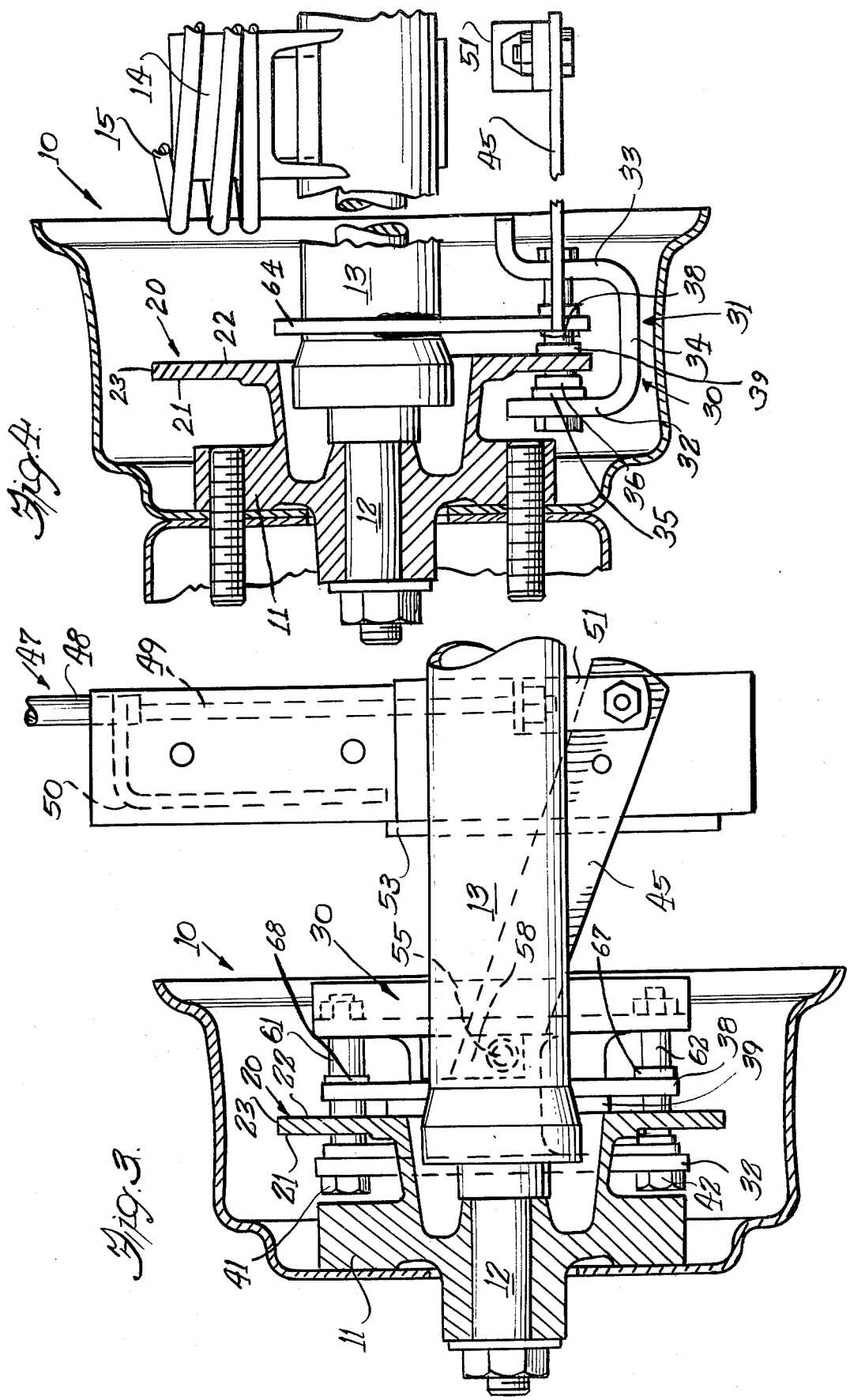

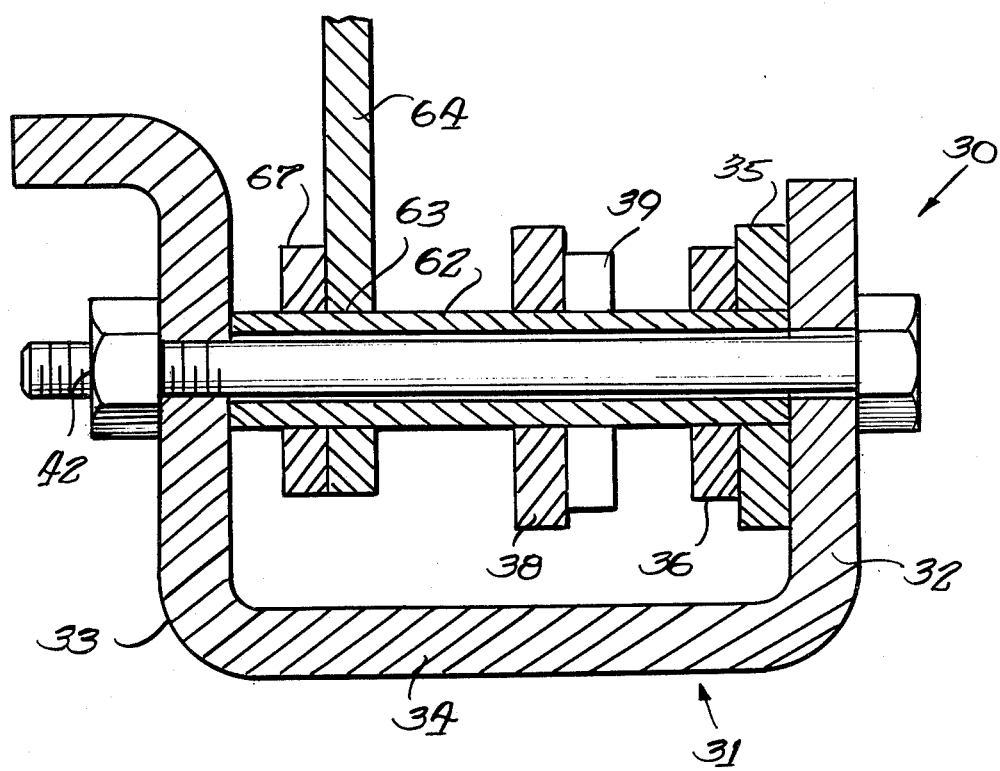

BRAKE LEVELING AND POSITIONING STRUCTURE

BACKGROUND OF THE INVENTION

This invention relates generally to brakes, and more particularly concerns the installation and use of a caliper-type disc brake.

Brake units of the type disclosed and claimed in U.S. Pat. No. 3,853,206 to Kibler et al and in co-pending U.S. application Ser. No. 956,488 filed Nov. 1, 1978, Pat. No. 4,199,042, have met with marked commercial success. They are highly effective in controlling light recreational vehicles, small garden tractors, riding lawn mowers, golf carts and other devices.

At least some golf cart manufacturers install brakes of this type by extending brake unit assembly bolts through a bracket secured to the vehicle. In the past, the brake units have not been rigidly attached to the bracket and vehicle. Because the brake bolt/bracket aperture support point does not coincide with the brake unit center of gravity, brake units so mounted tended to tilt with respect to the bracket and other vehicle parts. Under these conditions, the brake unit friction pads may rub against the wheel-mounted brake rotor disc. This rubbing action causes friction pad wear and can at least marginally rob the vehicle of effectively available motive power. Friction and misalignment between other parts can also degrade brake unit performance. One solution to this problem is shown in co-pending U.S. application Ser. No. 956,488 filed Nov. 1, 1978.

An object of the present invention is to provide a mounting system for securing a brake unit to a vehicle so that brake drag and consequent wear and motive power loss are minimized or eliminated. A related object is to provide a mounting system in which correct, minimal-drag alignment of all brake unit parts is encouraged.

Another object is to provide such a mounting system which is of minimal cost, yet of maximum effectiveness.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is a sectional view taken substantially in the plane of line 3—3 in FIG. 1 and looking generally downward from a position atop the brake unit, and showing the novel brake unit, vehicle axle, and a bottom portion of a vehicle wheel hub;

FIG. 4 is a sectional view taken substantially in the plane of line 4—4 in FIG. 1 and showing the vehicle wheel hub, the brake unit and associated mounting and other structure from a generally side elevational position; and FIG. 5 is a sectional view taken substantially in the plane of line 5—5 in FIG. 1 and showing the brake unit and associated mounting structure in further detail.

DETAILED DESCRIPTION

Figure 1:
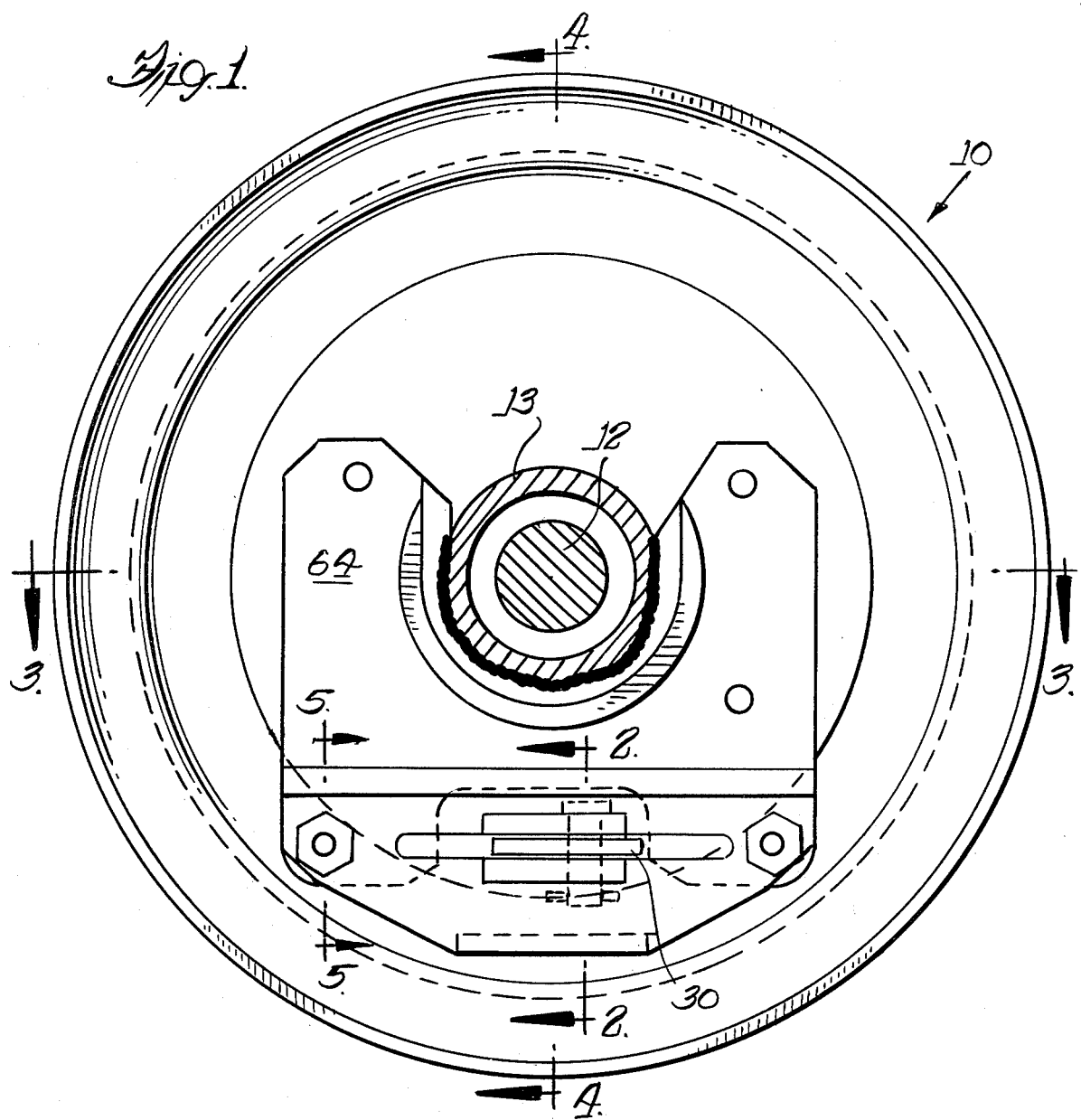
FIG. 1 is an elevational view showing a vehicle wheel, axle, brake unit for engaging the vehicle wheel, and parts of the brake mounting device.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

More specifically, the drawings show a vehicle wheel 10 mounted upon a wheel hub 11. The hub 11 is secured to a vehicle axle 12 which is at least partially carried within an axle housing 13. As shown particularly in FIG. 4, this axle housing 13 can be engaged by a suspension foot 14 which is, in turn, appropriately attached to vehicle suspension devices (not shown). A suspension spring 15 here surrounds the foot 14. A vehicle tire (not shown) is mounted upon the vehicle wheel 10.

The mechanism illustrated here includes a caliper-type disc brake; a brake unit disc 20 is formed integrally with the wheel hub 11 in the illustrated embodiment and the disc 20 extends in a generally radially outward direction from the vehicle axle 12 and axle housing 13. The brake disc 20 is defined by opposed faces 21 and 22 and a disc periphery 23.

A caliper disc brake unit 30 of the spot type is mounted to surround the brake disc faces 21 and 22 and to overlie the brake disc periphery 23 at a given location. This brake unit 30 includes a bi-legged, U-shaped brake housing 31 which can be considered to include generally opposed legs 32 and 33 joined by a bight portion 34. Upon one leg 32 is secured a first stator element 35 which is mounted in turn to a first brake friction pad 36 formed of appropriate material. A second stator member 38 mounts a second friction pad 39 in opposed relation to the first friction pad 36 for engaging, respectively, the opposite sides 21 and 22 of the interposed brake disc 20.

As can be envisioned from FIG. 3, the second stator member 38 is mounted for translational sliding motion toward and away from the disc 20. When braking action is desired, a brake actuator lever 45 is rotated into a brake-energized position in a counter-clockwise direction, as illustrated in FIG. 3. This lever rotation can be accomplished by any convenient means such as a bowden cable device 47 having a sheath 48 from which extends a cable member 49. The cable sheath 48 can be secured to an appropriate mount 50; the cable 49 can be attached to the lever 45 by an attachment angle member 51. If desired, a splash guard 53 can be mounted to the axle housing 13 in depending relationship so as to discourage mud or other corruption from reaching the angle bracket 51 and the associated bowden cable 47.

When the bowden cable 47 is appropriately actuated, the brake actuator lever 45 pivots about a pivot pin 55. When lever rotation occurs, a lever end 58 engages the second stator 38 and drives the second stator to the left as shown in FIGS. 3 and 4 so as to cause stator brake pad 39 engagement with the opposed brake disc face 22. Simultaneously, the reaction of the pivot pin 55 against the housing leg 33 draws the entire housing 30 in an opposite direction. Thus, the brake pad 36 is pulled into engagement with the opposite brake disc face 21. A pinching, braking action is thus applied to the brake disc 20 and, consequently, retarding action is applied to the wheel 10.

To attach this brake unit 30 to the vehicle so as to carry the brake in a desired position in accordance with the invention, the brake unit bolts 41 and 42 are each provided with spacer bushings 61 and 62, respectively. As shown particularly in FIG. 5, the spacer bushing 62 is passed through a relatively snug aperture 63 in a mounting bracket 64. (Similarly, the spacer bushing 61 is passed through a snug aperture at the opposite side of the mounting plate 64). Again as shown in FIG. 5, these spacer bushings engage the mounting bolts over an extended axial portion of their lengths, and provide rigidity to the U-shaped brake housing 30 and other portions of the brake unit.

To further encourage this rigidity and to correctly position the brake parts, mounting plate bushings 67, 68 are provided on the mounting plate 64 and these bushings 67, 68 are located in positions to extend the mounting bracket-spacer interengagement in a direction parallel to the mounting bolt axes. In this way, the mounting bracket 64 engages each spacer bushings 62 and 63 at a single position, but with sufficient rigidity to orient each spacer bushing 62 and 63 in a predetermined direction relative to the mounting bracket 64. In this way, the brake mounting bolts and, consequently, the associated brake parts are caused to be carried in predetermined positions relative to the mounting plates. More specifically, the stator elements 35 and 38 and the associated brake pads 36 and 39 are carried in positions relatively parallel to the adjacent faces 21 and 22 of the brake disc 20. Aligning action is also provided to the lever 45 via the housing 31, plates 71 and 72 and pin 55. To conserve space and further encourage correct brake carrying action, the bushing extensions 67 and 68 are located between the housing leg 33 and the mounting plate 64.

In further accordance with the invention, the actuator lever 45 is carried in a predetermined position plane relative to other portions of the brake unit 30 so as to avoid canting the brake unit 30. This lever alignment and support is provided inexpensively, without requiring extensive modifications to or appurtenances on the brake housing 31 or other brake parts. To carry out this aspect of the invention, first and second pivot plates 71 and 72 are located respectively above and below the actuator lever 45. These plates 71 and 72 extend beyond the housing 31 and through an actuator lever-accepting slot 74 defined by edges 75 and 76 in the housing leg 33. The slot surfaces 75 and 76 are so oriented, and are so spaced apart as to orient the plates 71 and 72 and the sandwiched actuator lever 45 in the desired positional plane, but lever motion in that plane is not inhibited.

Figure 2:
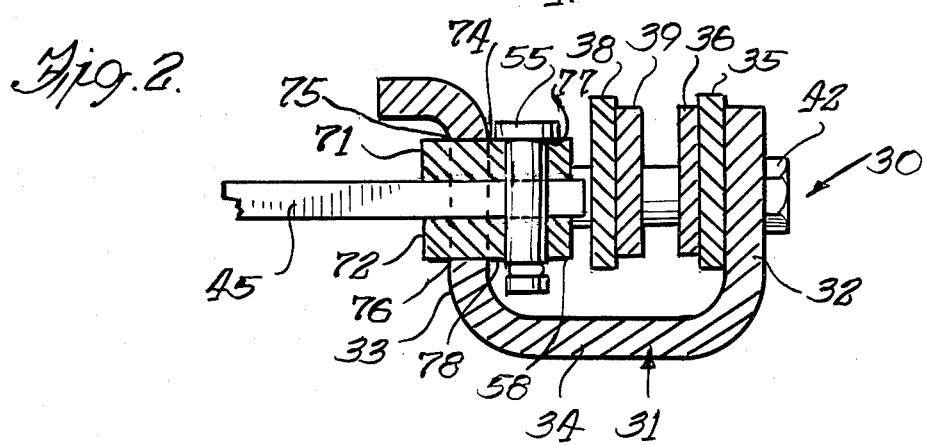
FIG. 2 is a sectional view taken substantially in the plane of line 2—2 in FIG. 1 and showing the brake unit in further detail.

These lever bearing plates 71 and 72 are each provided with apertures 77 and 78 to permit the pin 55 to extend through the first plate 71, the actuator lever 45 and the second plate 72. As illustrated particularly in FIG. 2, the plates 71 and 72 thus bear against the lever 45 and against their adjacent respective slot edges 75 and 76 so as to urge the actuator lever 45 into a predetermined plane of positions relative to the housing 31, regardless of the operating position of the actuating lever 45. The pin 55 locks together this entire assembly to prevent unwanted movement and possible lever or brake housing canting action. Actuator lever and pivot plate removal are also prevented.

Thus, the brake housing 31 and associated stator elements are carried in a non-canting position relative to the brake disc. Moreover, the actuator lever 45 imposes no force upon the housing member 31 which would encourage this unwanted canting. In this way, the actual canting and the consequent brake-imposed friction on the brake disc 20 are minimized or eliminated.

The invention is claimed as follows:

1. A brake suspended from a vehicle comprising, in combination, a mounting bracket fixed to and extending from the vehicle, a bi-legged, U-shaped brake housing for partially surrounding the brake disc and mounting bracket and defining an actuator lever-accepting slot, a plurality of mounting bolts extending between the brake housing legs and through the mounting bracket, each mounting bolt carrying a spacer bushing between the brake housing legs, a first stator friction element on one housing leg for engaging one side of the brake disc, a second stator friction element carried at least partially within the housing and slidably carried on the mounting bolt spacer bushings for engaging an opposite side of the brake disc, an actuator lever extending through the housing slot, the lever being connected to the housing and engaging the stator for drawing the housing in a given direction to urge the first stator friction element into disc engagement while driving the second stator friction element into disc engagement, actuator lever leveling means including at least one pivot plate extending through the actuator lever-accepting slot in the housing above the lever, and a second pivot plate extending through the lever-accepting slot in the housing below the lever, each pivot plate bearing against the actuator lever over an extended lever distance and against the housing only at the housing slot to urge the actuator lever into a predetermined plane of positions relative to the housing, a pivot pin extending through both pivot plates and the actuator lever but not restrained by the housing, the mounting bracket including a mounting plate and a mounting bushing on the mounting plate, the plate and bushing together engaging each spacer bushing means over an extended distance with sufficient rigidity to orient the spacer bushing means in a predetermined direction relative to the mounting bracket, whereby to cause the brake mounting bolt, and, consequently, associated brake parts to be carried in a predetermined position relative to the mounting plate and vehicle.

2. A brake according to claim 1 wherein said mounting bracket is fixed to and extends from an axle housing.

* * * * *